United States Patent
Balakrishnan et al.

(10) Patent No.: US 11,405,075 B2
(45) Date of Patent: Aug. 2, 2022

(54) METHOD AND SYSTEM FOR ENABLING DISTRIBUTED MULTIPLE-INPUT-MULTIPLE-OUTPUT COMMUNICATION IN WIRELESS NETWORKS

(71) Applicant: NXP USA, Inc., Austin, TX (US)

(72) Inventors: Hari Ram Balakrishnan, Chennai (IN); Sudhir Srinivasa, Los Gatos, CA (US)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 16/929,075

(22) Filed: Jul. 14, 2020

(65) Prior Publication Data
US 2022/0021416 A1   Jan. 20, 2022

(51) Int. Cl.
| | |
|---|---|
| H04B 7/024 | (2017.01) |
| H04W 88/08 | (2009.01) |
| H04W 48/20 | (2009.01) |
| H04W 52/24 | (2009.01) |
| H04W 84/12 | (2009.01) |
| H04W 24/02 | (2009.01) |
| H04W 48/16 | (2009.01) |

(52) U.S. Cl.
CPC ............ *H04B 7/024* (2013.01); *H04W 24/02* (2013.01); *H04W 48/16* (2013.01); *H04W 48/20* (2013.01); *H04W 52/242* (2013.01); *H04W 84/12* (2013.01); *H04W 88/08* (2013.01)

(58) Field of Classification Search
CPC ............................... H04W 88/08; Y02D 30/70
USPC .............................................. 455/410, 456.3
See application file for complete search history.

(56) References Cited

U.S. PATENT DOCUMENTS

| | | | |
|---|---|---|---|
| 2015/0011254 A1* | 1/2015 | Chande | H04W 52/24 455/522 |
| 2019/0132762 A1* | 5/2019 | Zhu | H04W 24/08 |

FOREIGN PATENT DOCUMENTS

WO   2019229662 A   12/2019

OTHER PUBLICATIONS

Noh, Y., "Considerations on PHY Padding and Packet Extension in 11ax", IEEE 802.11-15/1089r0, Sep. 14, 2015.
Porat, R., "Cumulative impact of multiple impairments on JT performance", IEEE 802.11-19/1597r0, Sep. 2019.
Srinivasa, S., "Joint Beamforming Simulations", IEEE 802.11-19/1094r0, Jul. 15, 2019.

\* cited by examiner

*Primary Examiner* — Kiet M Doan

(57) ABSTRACT

A first access point (AP) for enabling distributed multiple-input-multiple-output (DMIMO) communication in a wireless network is disclosed. The first AP is configured to select a wireless client from a plurality of wireless clients or a second AP from a plurality of APs such that a difference between a path loss value associated with the first AP and the wireless client, and a path loss value associated with the second AP and the wireless client is greater than or equal to a threshold value. The wireless client is selected when the first and second APs are available for DMIMO communication, and the second AP is selected when the wireless client and the first AP are available for DMIMO communication. The first AP is further configured to associate the first and second APs with the wireless client for enabling DMIMO communication between the first and second APs and the wireless client.

20 Claims, 11 Drawing Sheets

METHOD AND SYSTEM FOR ENABLING DISTRIBUTED MULTIPLE-INPUT-MULTIPLE-OUTPUT COMMUNICATION IN WIRELESS NETWORKS

BACKGROUND

The present disclosure relates generally to wireless communication, and, more particularly, to a method and a system for enabling distributed multiple-input-multiple-output (DMIMO) communication in wireless networks.

Multiple-input-multiple-output (MIMO) communication techniques are widely used in wireless networks to increase data transfer speed and capacity of the wireless networks. In such communication techniques, each access point (AP) in a wireless network operates independently of neighboring APs, and each wireless client in the wireless network is capable of associating and communicating with a single AP. Thus, the MIMO communication techniques fail to take an unabridged advantage of available spatial resources, and are unable to achieve a desired bandwidth for operation in crowded wireless network environments (e.g., offices, public places, or the like).

One approach to solve the above-mentioned problem includes enabling multiple APs to collaborate in serving wireless clients by way of distributed MIMO (DMIMO) communication techniques. In the DMIMO communication techniques, multiple APs communicate, in synchronization, with a single wireless client such that antennas of the collaborating APs operate as a virtual antenna array. The APs and the wireless client are selected such that unabridged transmission capacities of the APs are utilized. This leads to an increase in beamforming gains of the APs, and in turn, to an increase in throughput, reliability, and range of the wireless network. Typically, the APs and the wireless client that are selected for DMIMO communication require a significant level of synchronization therebetween (i.e., timing phase synchronization and carrier frequency synchronization). The significant level of synchronization is difficult to achieve in real-time wireless network environments, and hence curtails performances (i.e., data transfer speeds and throughputs) of the APs and the wireless client. Therefore, there exists a need for a method and a system that solves the aforementioned problems associated with existing techniques of selecting APs and wireless clients for DMIMO communication.

SUMMARY

In one embodiment, a first access point (AP) of a wireless network for enabling distributed multiple-input-multiple-output (DMIMO) communication in the wireless network is disclosed. The first AP includes processing circuitry that is configured to select, for DMIMO communication, at least one of a first wireless client from a plurality of wireless clients of the wireless network and a second AP from a plurality of APs of the wireless network. The first wireless client is selected when the first and second APs are available for DMIMO communication, and the second AP is selected when the first wireless client and the first AP are available for DMIMO communication. The second AP and the first wireless client are selected such that a difference between a first path loss value that is associated with the first AP and the first wireless client, and a second path loss value that is associated with the second AP and the first wireless client is greater than or equal to a first threshold value. The processing circuitry is further configured to associate the first and second APs with the first wireless client for enabling DMIMO communication between the first and second APs and the first wireless client.

In another embodiment, a method for enabling distributed multiple-input-multiple-output (DMIMO) communication in a wireless network by a first access point (AP) of the wireless network is disclosed. The method includes selecting, for DMIMO communication, at least one of a first wireless client from a plurality of wireless clients of the wireless network and a second AP from a plurality of APs of the wireless network. The first wireless client is selected when the first and second APs are available for DMIMO communication, and the second AP is selected when the first wireless client and the first AP are available for DMIMO communication. The second AP and the first wireless client are selected such that a difference between a first path loss value that is associated with the first AP and the first wireless client, and a second path loss value that is associated with the second AP and the first wireless client is greater than or equal to a first threshold value. The method further includes associating the first and second APs with the first wireless client for enabling DMIMO communication between the first and second APs and the first wireless client.

In some examples, the processing circuitry is further configured to transmit a first plurality of wireless signals to the plurality of wireless clients such that a first wireless signal of the first plurality of wireless signals is transmitted to the first wireless client.

In some examples, the processing circuitry is further configured to receive a first DMIMO request from the second AP. The first DMIMO request indicates that the second AP is available for DMIMO communication. The processing circuitry is further configured to generate and transmit, upon reception of the first DMIMO request, a plurality of communication requests to the plurality of wireless clients, respectively, and receive a plurality of communication responses to the plurality of communication requests from the plurality of wireless clients, respectively. Further, the processing circuitry is configured to determine, for each wireless client of the plurality of wireless clients based on each corresponding communication response, whether a difference between a path loss value associated with the first AP and each wireless client, and a path loss value associated with the second AP and each wireless client is greater than or equal to the first threshold value. Based on the determination that the difference between the first and second path loss values is greater than or equal to the first threshold value, the first wireless client is selected for DMIMO communication.

In some examples, each communication request of the plurality of communication requests corresponds to a frame request, and each communication response of the plurality of communication responses corresponds to a frame report. A first communication response of the plurality of communication responses is indicative of a signal strength of the first wireless signal, and a signal strength of a second wireless signal that is received by the first wireless client from the second AP.

In some examples, each communication request of the plurality of communication requests corresponds to a location request, and each communication response of the plurality of communication responses corresponds to a location report. A first communication response of the plurality of communication responses is indicative of a location of the first wireless client.

In some examples, the processing circuitry is further configured to receive a second DMIMO request from the first wireless client. The second DMIMO request indicates that the first wireless client is available for DMIMO communication. The processing circuitry is further configured to generate and transmit, upon reception of the second DMIMO request, a frame request to the first wireless client, and receive a frame report as a response to the frame request from the first wireless client. The processing circuitry is further configured to determine, for each AP of the plurality of APs based the frame report, whether a difference between the first path loss value and a path loss value associated with each AP of the plurality of APs and the first wireless client is greater than or equal to the first threshold value. Further, the processing circuitry is configured to identify, from the plurality of APs, a set of APs such that for each AP of the set of APs, the difference between the first path loss value and the path loss value associated with each AP of the set of APs and the first wireless client is greater than or equal to the first threshold value.

In some examples, based on the identification of the set of APs, the processing circuitry is further configured to generate and transmit a set of availability requests to the set of APs, respectively, and receive a set of availability responses to the set of availability requests from the set of APs, respectively. A first availability response of the set of availability responses is indicative of the availability of the second AP for enabling DMIMO communication. The second AP is selected when the first availability response indicates that the second AP is available.

In some examples, the frame report is indicative of a first address of the first AP, a signal strength of the first wireless signal, and a first basic service set identifier of the first AP. The frame report is further indicative of a second plurality of addresses associated with the plurality of APs, signal strengths of a second plurality of wireless signals received by the first wireless client from the plurality of APs, and a second plurality of basic service set identifiers of the plurality of APs, respectively.

In some examples, the first AP further includes a memory that is coupled with the processing circuitry. The processing circuitry is further configured to store, in the memory, data pertaining to the association of the first and second APs with the first wireless client.

In some examples, the processing circuitry is further configured to dissociate the second AP from the first wireless client and the first AP when at least one of the difference between the first and second path loss values is less than a second threshold value and the second AP is unavailable for DMIMO communication for a predetermined time duration.

In some examples, the processing circuitry is further configured to dissociate the first wireless client from the first and second APs when the difference between the first and second path loss values is less than the second threshold value.

Various embodiments of the present disclosure disclose a first access point (AP) of a wireless network for enabling distributed multiple-input-multiple-output (DMIMO) communication in the wireless network. The first AP is configured to select, for DMIMO communication, at least one of a first wireless client from a plurality of wireless clients of the wireless network and a second AP from a plurality of APs of the wireless network. The first AP selects the first wireless client when the first and second APs are available for DMIMO communication. Similarly, the first AP selects the second AP when the first wireless client and the first AP are available for DMIMO communication. The second AP and the first wireless client are selected such that a difference between a first path loss value that is associated with the first AP and the first wireless client, and a second path loss value that is associated with the second AP and the first wireless client is greater than or equal to a first threshold value. The first AP is further configured to associate the first and second APs with the first wireless client for enabling DMIMO communication between the first and second APs and the first wireless client.

Thus, the first AP ensures that the second AP or the first wireless client is selected for DMIMO communication exclusively when the difference between the first and second path loss values is greater than or equal to the first threshold value. As the second AP or the first wireless client is selected based on the difference between the first and second path loss values, a level of synchronization required between the first and second APs and the first wireless client is less than that required between APs and a wireless client selected by way of conventional selection techniques. As a result, performances (i.e., data transfer speeds and throughputs) of the first and second APs and the first wireless client of the present disclosure are higher than that of the APs and the wireless client selected by way of the conventional selection techniques.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
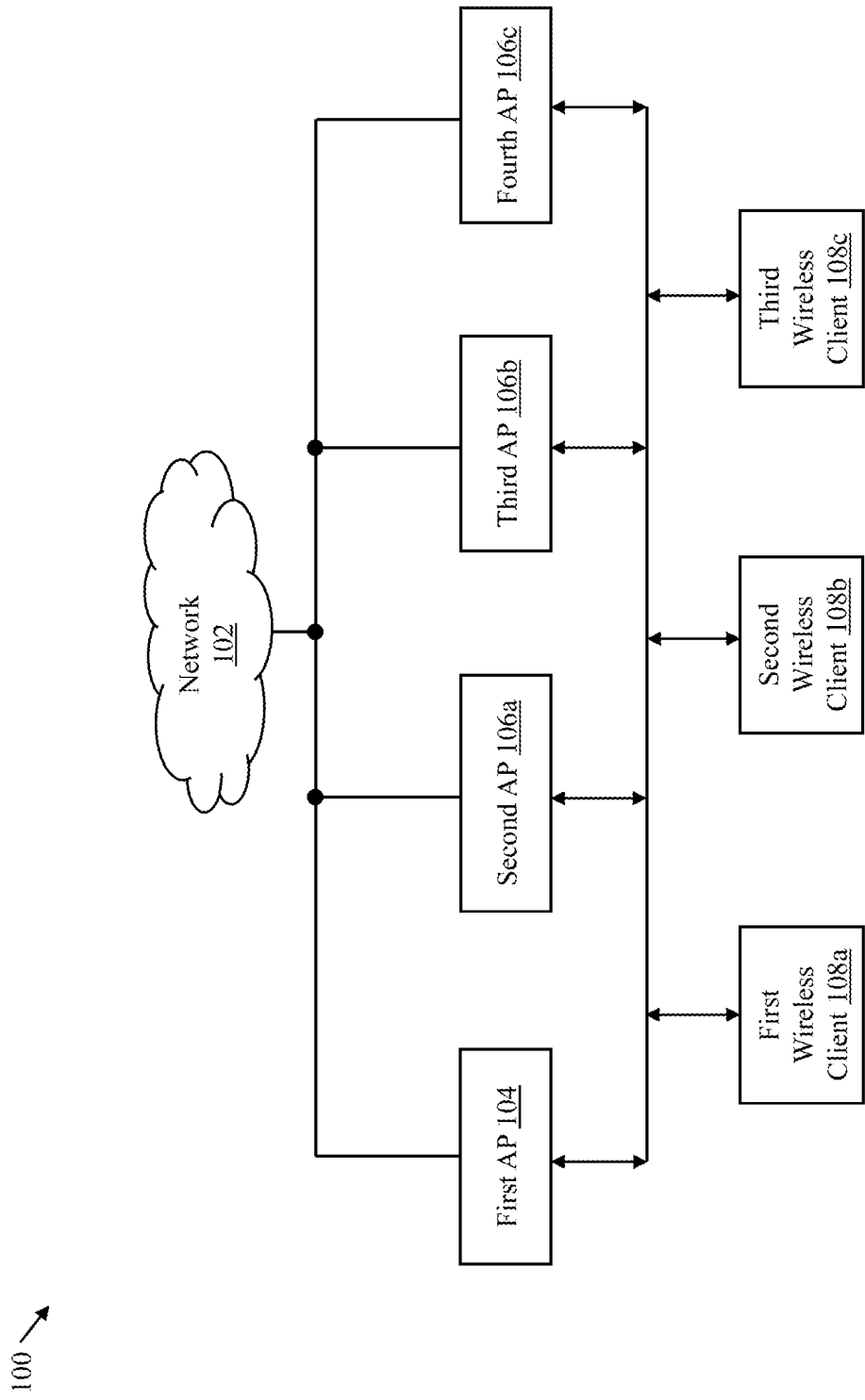
FIG. 1 illustrates a schematic block diagram of an exemplary wireless network environment in accordance with an embodiment of the present disclosure.

FIG. 1 illustrates a schematic block diagram of an exemplary wireless network environment 100 in accordance with an embodiment of the present disclosure. The wireless network environment 100 includes a network 102, a first access point (AP) 104, a plurality of APs of which second through fourth APs 106a-106c are shown, and a plurality of wireless clients of which first through third wireless clients 108a-108c are shown. The second through fourth APs 106a-106c are collectively referred to as a "plurality of APs 106a-106c".

The first AP 104 is a physical network device that allows the wireless clients (e.g., the first through third wireless clients 108a-108c) in the wireless network environment 100 to couple with the network 102. Examples of the network 102 may include a local area network (LAN), a public network such as the Internet, a hybrid network such as a virtual private network (VPN), a public cloud, a private cloud, a hybrid cloud, or the like. The coupling between the first AP 104 and the network 102 may be wired or wireless. In one embodiment, the first AP 104 may be coupled with the network 102 by way of a router (not shown), a switch (not shown), a controller (not shown), or a combination thereof.

The first AP 104 is coupled with the second through fourth APs 106a-106c and the first through third wireless clients 108a-108c, and is configured to enable distributed multiple-input-multiple-output (DMIMO) communication (i.e., multiple APs communicating, in synchronization, with a single wireless client) in the wireless network environment 100. DMIMO communication may be initiated by an AP of the second through fourth APs 106a-106c or a wireless client of the first through third wireless clients 108a-108c. In one embodiment, DMIMO communication is initiated by the second AP 106a. In another embodiment, DMIMO communication is initiated by the first wireless client 108a. Further, the first AP 104 is configured to transmit first through third wireless signals (shown later in FIGS. 2A and 4A) to the first through third wireless clients 108a-108c, respectively. The first through third wireless signals are collectively referred to as a "first plurality of wireless signals".

When DMIMO communication is initiated by the second AP 106a, the first AP 104 is configured to receive a first DMIMO request from the second AP 106a. The first DMIMO request indicates that the second AP 106a is available for DMIMO communication. Upon reception of the first DMIMO request, the first AP 104 is further configured to generate and transmit first through third communication requests to the first through third wireless clients 108a-108c, respectively. Further, the first AP 104 is configured to receive, from the first through third wireless clients 108a-108c, first through third communication responses to the first through third communication requests, respectively. The first through third communication requests are collectively referred to as a "plurality of communication requests", and the first through third communication responses are collectively referred to as a "plurality of communication responses". In one embodiment, the first through third communication requests correspond to first through third location requests, and the first through third communication responses correspond to first through third location reports, respectively. The first through third location reports are indicative of first through third locations of the first through third wireless clients 108a-108c, respectively. In another embodiment, the first through third communication requests correspond to first through third frame requests, and first through third communication responses correspond to first through third frame reports, respectively.

The first frame report is indicative of a signal strength of the first wireless signal received by the first wireless client 108a from the first AP 104, and a signal strength of a fourth wireless signal (shown later in FIGS. 2A and 4A) received by the first wireless client 108a from the second AP 106a. The first frame report is further indicative of first and second addresses of the first and second APs 104 and 106a, and first and second basic service set identifiers (BSSIDs) of the first and second APs 104 and 106a, respectively. Similarly, the second frame report is indicative of a signal strength of the second wireless signal received by the second wireless client 108b from the first AP 104, a signal strength of a fifth wireless signal (shown later in FIG. 2A) received by the second wireless client 108b from the second AP 106a, the first and second addresses, and the first and second BSSIDs. Further, the third frame report is indicative of a signal strength of the third wireless signal received by the third wireless client 108c from the first AP 104, a signal strength of a sixth wireless signal (shown later in FIG. 2A) received by the third wireless client 108c from the second AP 106a, the first and second addresses, and the first and second BSSIDs. It will be apparent to a person skilled in the art that each of the first through third frame reports may additionally be indicative of signal strengths of various other wireless signals received by the corresponding wireless client from various other APs of the wireless network environment 100 (e.g., the fourth AP 106c), addresses of the APs, and BSSIDs of the APs.

The first AP 104 is further configured to determine, for each wireless client of the first through third wireless clients 108a-108c based on each corresponding communication response, a path loss value (i.e., a value of signal attenuation) associated with the first AP 104 and each wireless client, and a path loss value associated with the second AP 106a and each wireless client. The first AP 104 is further configured to determine, for each wireless client, whether the difference between the path loss value associated with the first AP 104 and each wireless client, and the path loss value associated with the second AP 106a and each wireless client is greater than or equal to a first threshold value. In an embodiment, the first threshold value is determined based on a number of antennas of the first through fourth APs 104 and 106a-106c and a number of antennas of the first through third wireless clients 108a-108c. In an example, the first threshold value corresponds to 10 decibels. For the sake of ongoing discussion, it is assumed that the difference between the path loss value associated with the first AP 104 and the first wireless client 108a, and the path loss value associated with the second AP 106a and the first wireless client 108a is greater than or equal to the first threshold value. The path loss value that is associated with the first AP 104 and the first wireless client 108a is hereinafter referred to as a "first path loss value", and the path loss value that is associated with the second AP 106a and the first wireless client 108a is hereinafter referred to as a "second path loss value". Based on the determination that the difference between the first and second path loss values is greater than or equal to the first threshold value, the first AP 104 is further configured to select the first wireless client 108a for DMIMO communication.

The first AP 104 is further configured to associate the first and second APs 104 and 106a with the first wireless client 108a for enabling DMIMO communication between the first and second APs 104 and 106a and the first wireless client 108a. The first and second APs 104 and 106a then communicate with the first wireless client 108a by way of DMIMO communication techniques. In such a scenario, with respect to the first wireless client 108a, the first AP 104 is a primary AP and the second AP 106a is a secondary AP. Further, the association of the first and second APs 104 and 106a with the first wireless client 108a enables seamless handover of primary functionalities from the first AP 104 to the second AP 106a when a load associated with the first AP 104 is greater than a load associated with the second AP 106a. The first AP 104 is further configured to store, in a memory (shown later in FIG. 5) associated with the first AP 104, data pertaining to the association of the first and second APs 104 and 106a with the first wireless client 108a. The stored data may be utilized to select the first wireless client 108a when the second AP 106a initiates subsequent DMIMO communication by transmitting, to the first AP 104, a third DMIMO request that is similar to the first DMIMO request. Further, when the first AP 104 determines that the difference between the first and second path loss values is less than a second threshold value, the first AP 104 is further configured to dissociate the first wireless client 108a from the first and second APs 104 and 106a. In other words, the stored data pertaining to the association of the first and second APs 104 and 106a with the first wireless client 108a may be deleted. In an embodiment, the second threshold value is determined based on the number of antennas of the first through fourth APs 104 and 106a-106c and the number of antennas of the first through third wireless clients 108a-108c. In an example, the first and second threshold values are equal. In another example, the first and second threshold values are unequal. The selection of the first wireless client 108a for enabling DMIMO communication between the first and second APs 104 and 106a and the first wireless client 108a is explained in detail in conjunction with FIGS. 2A, 2B, 3A, and 3B.

When DMIMO communication is initiated by the first wireless client 108a, the first AP 104 is configured to receive a second DMIMO request from the first wireless client 108a. The second DMIMO request indicates that the first wireless client 108a is available for DMIMO communication. Upon reception of the second DMIMO request, the first AP 104 is further configured to generate and transmit a fourth frame request to the first wireless client 108a, and receive a fourth frame report as a response to the fourth frame report from the first wireless client 108a. It will be apparent to a person skilled in the art that the fourth frame request and report are similar to the first frame request and report, respectively. The fourth frame report is indicative of the first and second addresses and the first and second BSSIDs of the first and second APs 104 and 106a, and the signal strengths of the first and fourth wireless signals received by the first wireless client 108a from the first and second APs 104 and 106a, respectively. The fourth frame report is further indicative of third and fourth addresses and third and fourth BSSIDs of the third and fourth APs 106b and 106c, and signal strengths of seventh and eighth wireless signals (shown later in FIG. 4A) received by the first wireless client 108a from the third and fourth APs 106b and 106c, respectively.

The first AP 104 is further configured to determine, based on the fourth frame report, the first path loss value. Similarly, the first AP 104 is further configured to determine, for each AP of the second through fourth APs 106a-106c based the fourth frame report, a path loss value associated with each AP of the second through fourth APs 106a-106c and the first wireless client 108a. The first AP 104 is further configured to determine, for each AP of the second through fourth APs 106a-106c, whether the difference between the first path loss value and the path loss value associated with each AP of the second through fourth APs 106a-106c and the first wireless client 108a is greater than or equal to the first threshold value.

The first AP 104 is further configured to identify, from the second through fourth APs 106a-106c, a set of APs such that for each AP of the set of APs, the difference between the first path loss value and the path loss value associated with each AP of the set of APs and the first wireless client 108a is greater than or equal to the first threshold value. For the sake of ongoing discussion, it is assumed that set of APs includes the second and third APs 106a and 106b.

The first AP 104 is further configured to generate and transmit, based on the identification of the second and third APs 106a and 106b, first and second availability requests to the second and third APs 106a and 106b, respectively. Further, the first AP 104 is configured to receive first and second availability responses to the first and second availability requests from the second and third APs 106a and 106b, respectively. The first and second availability requests are collectively referred to as a "set of availability requests", and the first and second availability responses are collectively referred to as a "set of availability responses". The first and second availability responses are indicative of the availability of the second and third APs 106a and 106b for enabling DMIMO communication. The first AP 104 is further configured to select, based on the first and second availability responses, one of the second or third AP 106a or 106b for DMIMO communication. For the sake ongoing discussion, it is assumed that the first availability response indicates that the second AP 106a is available for enabling DMIMO communication, and the third availability response indicates the third AP 106b is unavailable for enabling DMIMO communication. Thus, the first AP 104 selects the second AP 106a for DMIMO communication.

The first AP 104 is further configured to associate the first and second APs 104 and 106a with the first wireless client 108a for enabling DMIMO communication between the first and second APs 104 and 106a and the first wireless client 108a. The first and second APs 104 and 106a then communicate with the first wireless client 108a by way of DMIMO communication techniques. In such a scenario, with respect to the first wireless client 108a, the first AP 104 is the primary AP and the second AP 106a is the secondary AP. The first AP 104 is further configured to store, in the memory, the data pertaining to the association of the first and second APs 104 and 106a with the first wireless client 108a. The stored data may be utilized to select the second AP 106a when the first wireless client 108a initiates subsequent DMIMO communication by transmitting, to the first AP 104, a fourth DMIMO request that is similar to the second DMIMO request. Further, when the first AP 104 determines that the difference between the first and second path loss values is less than the second threshold value or that the second AP 106a is unavailable for DMIMO communication for a predetermined time duration, the first AP 104 is further configured to dissociate the second AP 106a from the first AP 104 and the first wireless client 108a. In other words, the stored data may be deleted. For example, if the predetermined time duration is 10 microseconds, the second AP 106a is dissociated from the first wireless client 108a and the first AP 104 when the second AP 106a is unavailable for 10 microseconds. The selection of the second AP 106a for enabling DMIMO communication between the first and second APs 104 and 106a and the first wireless client 108a is explained in detail in conjunction with FIGS. 4A and 4B.

Figure 5:
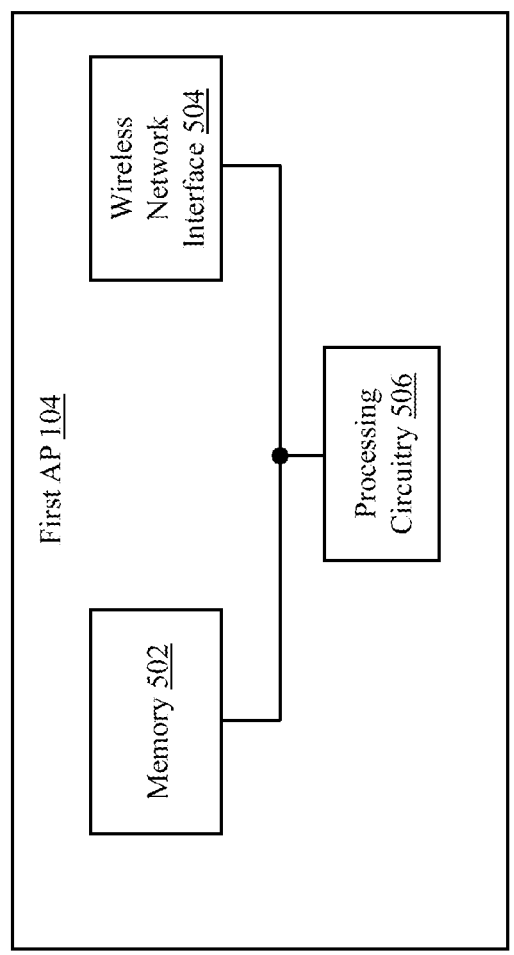
FIG. 5 illustrates a schematic block diagram of the first AP in accordance with an embodiment of the present disclosure.

Various components of the first AP 104 and their functionalities are explained in detail in conjunction with FIG. 5. Examples of the first AP 104 may include a wireless gateway, a cable modem, a wireless router, a mobile hot-spot router, a mobile phone having capability to create a hot-spot, a wireless range extender, a multimedia over coaxial alliance (MoCA) node, or the like.

The second AP 106a is a physical network device that allows the wireless clients (e.g., the first through third wireless clients 108a-108c) in the wireless network environment 100 to couple with the network 102. The coupling between the second AP 106a and the network 102 may be wired or wireless. The second AP 106a is structurally similar to the first AP 104.

The second AP 106a is coupled with the first through third wireless clients 108a-108c, and is configured to transmit the fourth through sixth wireless signals to the first through third wireless clients 108a-108c, respectively. The fourth through sixth wireless signals are collectively referred to as a "second plurality of wireless signals". The second AP 106a is further configured to transmit the first DMIMO request to the first AP 104 for initiating DMIMO communication. Further, when DMIMO communication is initiated by the first wireless client 108a, the second AP 106a is configured to receive the first availability request from the first AP 104. In response to the first availability request, the second AP 106a is further configured to generate and transmit the first availability response to the first AP 104.

The second AP 106a may additionally be configured to select, after the association of the first and second APs 104 and 106a with the first wireless client 108a, a wireless client from the second and third wireless clients 108b and 108c for DMIMO communication. For the sake of ongoing discussion, it is assumed that the second AP 106a selects the second wireless client 108b. The second wireless client 108b is selected such that a difference between a path loss value associated with the second AP 106a and the second wireless client 108b, and a path loss value associated with the first AP 104 and the second wireless client 108b is greater than or equal to the first threshold value. In an embodiment, the second wireless client 108b is associated with the second AP 106a prior to the initiation of DMIMO communication. The second AP 106a is further configured to associate the first and second APs 104 and 106a with the second wireless client 108b for enabling DMIMO communication between the first and second APs 104 and 106a and the second wireless client 108b. In such a scenario, with respect to the second wireless client 108b, the second AP 106a is the primary AP and the first AP 104 is the secondary AP.

The third and fourth APs 106b and 106c are structurally and functionally similar to the second AP 106a. Examples of the second through fourth APs 106a-106c may include a wireless gateway, a cable modem, a wireless router, a mobile hot-spot router, a mobile phone having capability to create a hot-spot, a wireless range extender, a MoCA node, or the like.

The first wireless client 108a is configured to receive various wireless signals from various APs of the wireless network environment 100. For example, the first wireless client 108a receives the first wireless signal from the first AP 104, and the fourth wireless signal from the second AP 106a. The first wireless client 108a may initiate DMIMO communication by transmitting the second DMIMO request to the first AP 104. Further, the first wireless client 108a is configured to receive a frame request (such as the first and fourth frame requests) or a location request (such as the first location request) from the first AP 104. In response to the frame request, the first wireless client 108a is further configured to generate and transmit a frame report (such as the first and fourth frame reports) to the first AP 104. Similarly, in response to the location request, the first wireless client 108a is further configured to generate and transmit a location report (such as the first location report) to the first AP 104. The second and third wireless clients 108b and 108c are structurally and functionally similar to the first wireless client 108a. Examples of the first through third wireless clients 108a-108c may include desktops, laptops, tablets, mobile phones, phablets, smart phones, televisions, set-top boxes, or other Internet of things (IoT) based devices.

Although FIG. 1 describes that DMIMO communication is enabled between the first and second APs 104 and 106a and the first wireless client 108a, the scope of the present disclosure is not limited to it. In various other embodiments, more than two APs may be associated with the first wireless client 108a for enabling DMIMO communication therebetween, without deviating from the scope of the present disclosure.

Figure 2A:
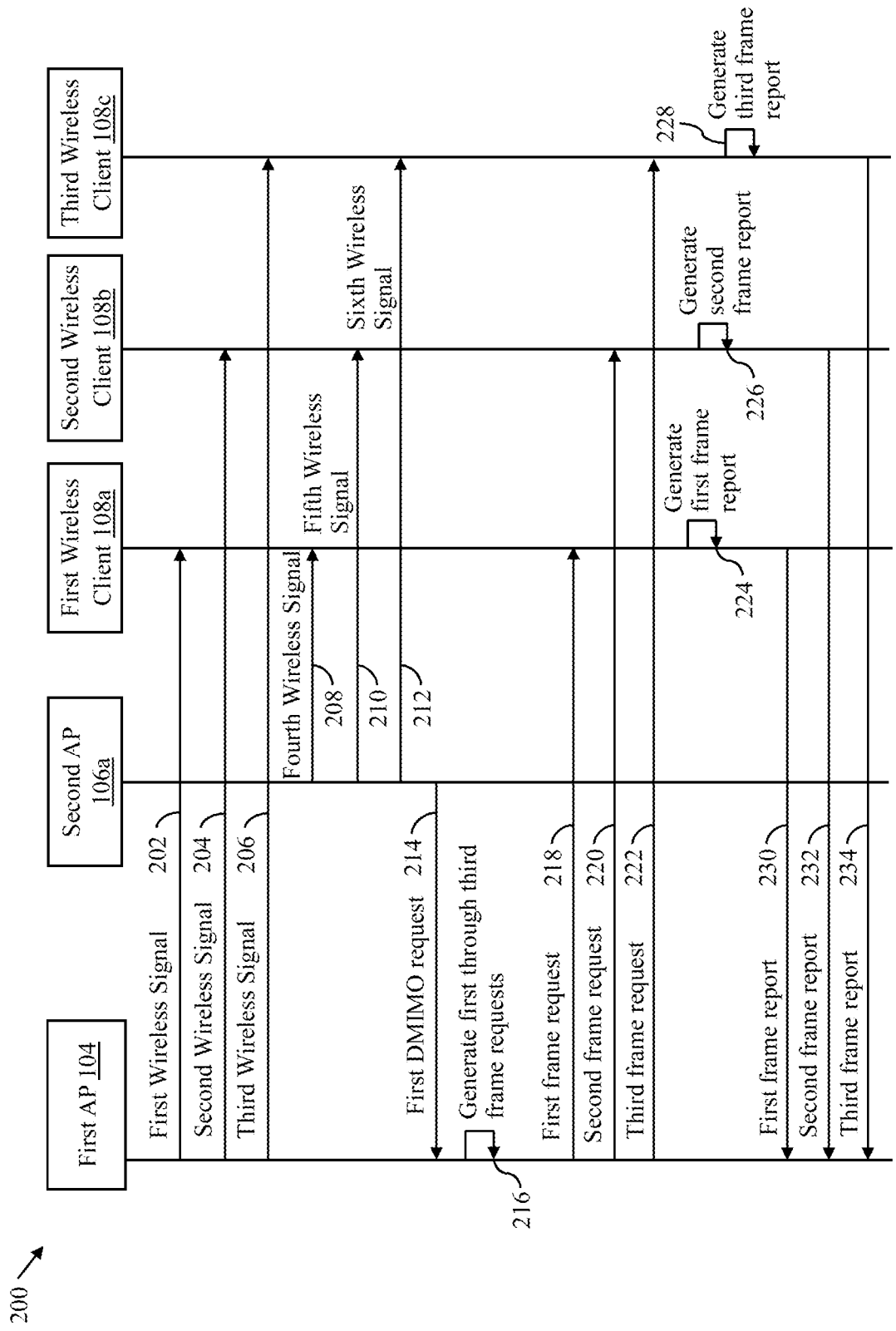
FIGS. 2A and 2B, collectively, is a sequence diagram that illustrates selection of a first wireless client of FIG. 1 for enabling DMIMO communication between first and second APs of FIG. 1 and the first wireless client in accordance with an embodiment of the present disclosure.
Figure 2B:
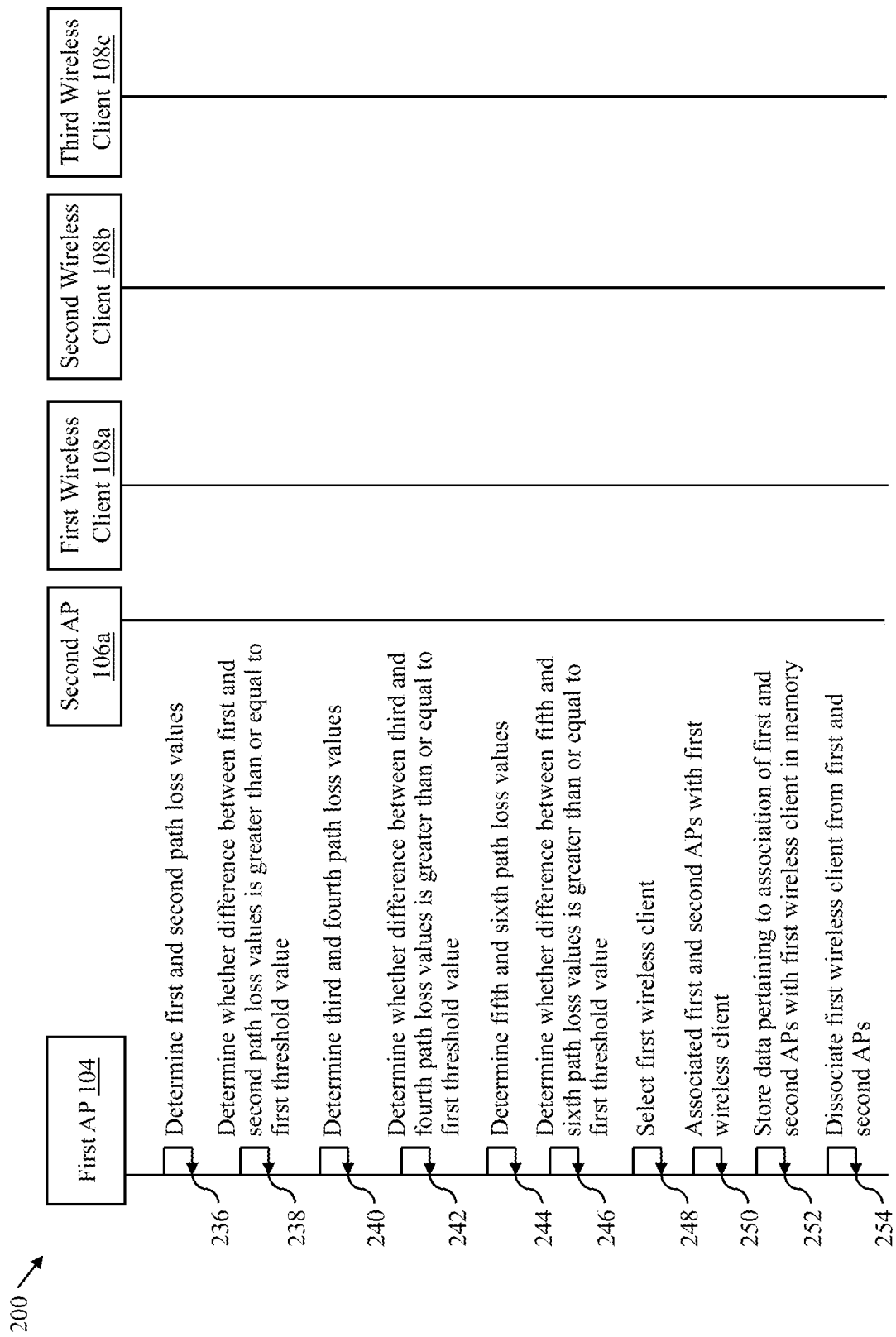

FIGS. 2A and 2B, collectively, is a sequence diagram 200 that illustrates the selection of the first wireless client 108a for enabling DMIMO communication between the first and second APs 104 and 106a and the first wireless client 108a in accordance with an embodiment of the present disclosure.

Referring now to FIG. 2A, the first AP 104 continuously transmits the first through third wireless signals to the first through third wireless clients 108a-108c, respectively (as shown by arrows 202, 204, and 206, respectively). Similarly, the second AP 106a continuously transmits the fourth through sixth wireless signals to the first through third wireless clients 108a-108c, respectively (as shown by arrows 208, 210, and 212, respectively).

When the second AP 106a initiates DMIMO communication, the first AP 104 receives the first DMIMO request from the second AP 106a (as shown by arrow 214). The first DMIMO request indicates that the second AP 106a is available for DMIMO communication. Upon reception of the first DMIMO request, the first AP 104 generates first through third frame requests (as shown by arrow 216). Further, the first AP 104 transmits the first through third frame requests to the first through third wireless clients 108a-108c, respectively (as shown by arrows 218, 220, and 222, respectively).

The first through third wireless clients 108a-108c generate, in response to the first through third frame requests, the first through third frame reports, respectively (as shown by arrows 224, 226, and 228, respectively). The first AP 104 receives the first through third frame reports from the first through third wireless clients 108a-108c, respectively (as shown by arrows 230, 232, and 234, respectively).

Referring now to FIG. 2B, the first AP 104 determines, for the first wireless client 108a, the first path loss value that is associated with the first AP 104 and the first wireless client 108a, and the second path loss value that is associated with the second AP 106a and the first wireless client 108a (as shown by arrow 236). The first and second path loss values are determined based on the first frame report (i.e., the signal strengths of the first and fourth wireless signals received by the first wireless client 108a from the first and second APs 104 and 106a, respectively). The first AP 104 then determines whether the difference between the first and second path loss values is greater than or equal to the first threshold value (as shown by arrow 238). For the sake of ongoing discussion, it is assumed that the difference between the first and second path loss values is greater than or equal to the first threshold value.

The first AP 104 determines, for the second wireless client 108*b*, the path loss value associated with the first AP 104 and the second wireless client 108*b*, and the path loss value associated with the second AP 106*a* and the second wireless client 108*b* (as shown by arrow 240). The path loss value that is associated with the first AP 104 and the second wireless client 108*b* is hereinafter referred to as a "third path loss value", and the path loss value that is associated with the second AP 106*a* and the second wireless client 108*b* is hereinafter referred to as a "fourth path loss value". The third and fourth path loss values are determined based on the second frame report (i.e., the signal strengths of the second and fifth wireless signals received by the second wireless client 108*b* from the first and second APs 104 and 106*a*, respectively). The first AP 104 then determines whether the difference between the third and fourth path loss values is greater than or equal to the first threshold value (as shown by arrow 242). For the sake of ongoing discussion, it is assumed that the difference between the third and fourth path loss values is less than the first threshold value.

The first AP 104 further determines, for the third wireless client 108*c*, the path loss value associated with the first AP 104 and the third wireless client 108*c*, and the path loss value associated with the second AP 106*a* and the third wireless client 108*c* (as shown by arrow 244). The path loss value that is associated with the first AP 104 and the third wireless client 108*c* is hereinafter referred to as a "fifth path loss value", and the path loss value that is associated with the second AP 106*a* and the third wireless client 108*c* is hereinafter referred to as a "sixth path loss value". The fifth and sixth path loss values are determined based on the third frame report (i.e., the signal strengths of the third and sixth wireless signals received by the third wireless client 108*c* from the first and second APs 104 and 106*a*, respectively). The first AP 104 further determines whether a difference between the fifth and sixth path loss values is greater than or equal to the first threshold value (as shown by arrow 246). For the sake of ongoing discussion, it is assumed that the difference between the fifth and sixth path loss values is less than the first threshold value.

The first AP 104 selects the first wireless client 108*a* for DMIMO communication based on the determination that the difference between the first and second path loss values is greater than or equal to the first threshold value (as shown by arrow 248). The first AP 104 then associates the first and second APs 104 and 106*a* with the first wireless clients 108*a* for enabling DMIMO communication between the first and second APs 104 and 106*a* and the first wireless client 108*a* (as shown by arrow 250). The first and second APs 104 and 106*a* then communicate with the first wireless client 108*a* by way of the DMIMO communication techniques. Further, the first AP 104 stores the data pertaining to the association of the first and second APs 104 and 106*a* with the first wireless client 108*a* in the memory (as shown by arrow 252). After the enablement of DMIMO communication, the first AP 104 continuously monitors the difference between the first and second path loss values, and dissociates the first wireless client 108*a* from the first and second APs 104 and 106*a* when the difference between the first and second path loss values is less than the second threshold value (as shown by arrow 254).

Figure 3A:
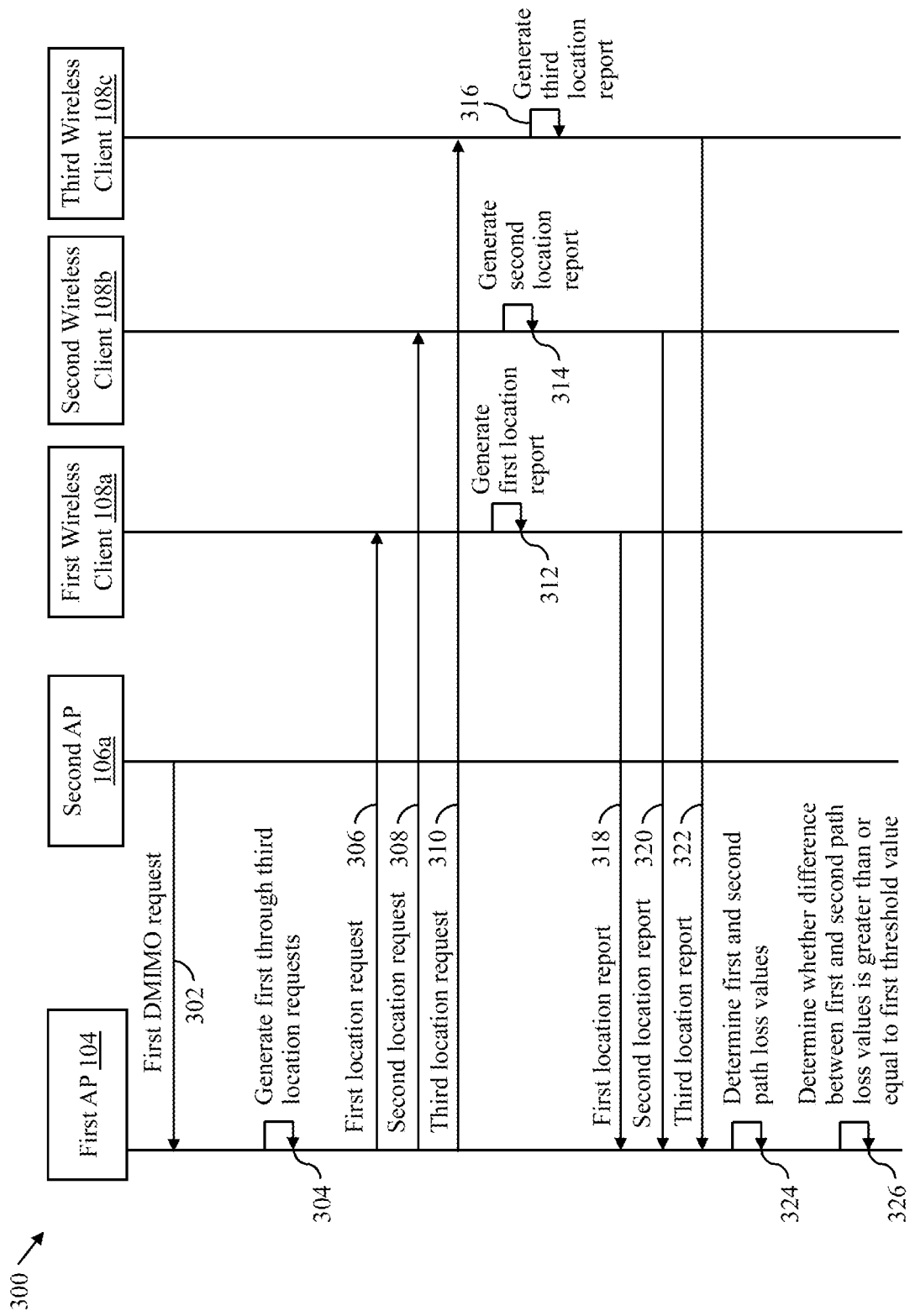
FIGS. 3A and 3B, collectively, is a sequence diagram that illustrates the selection of the first wireless client for enabling DMIMO communication between the first and second APs and the first wireless client in accordance with another embodiment of the present disclosure.
Figure 3B:
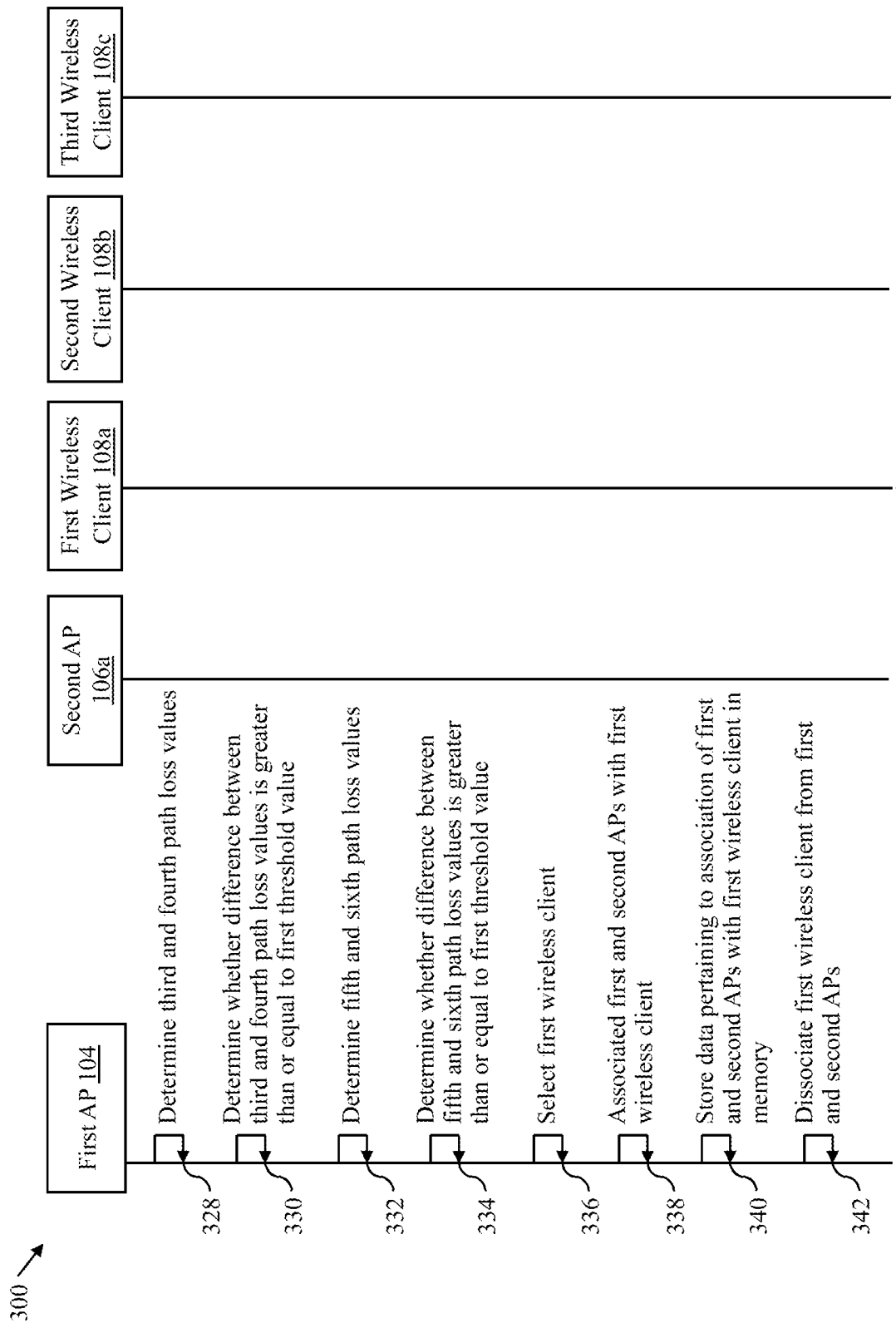

FIGS. 3A and 3B, collectively, is a sequence diagram 300 that illustrates the selection of the first wireless client 108*a* for enabling DMIMO communication between the first and second APs 104 and 106*a* and the first wireless client 108*a* in accordance with another embodiment of the present disclosure.

Referring now to FIG. 3A, when the second AP 106*a* initiates DMIMO communication, the first AP 104 receives the first DMIMO request from the second AP 106*a* (as shown by arrow 302). The first DMIMO request indicates that the second AP 106*a* is available for DMIMO communication. Upon reception of the first DMIMO request, the first AP 104 generates the first through third location requests (as shown by arrow 304). Further, the first AP 104 transmits the first through third location requests to the first through third wireless clients 108*a*-108*c*, respectively (as shown by arrows 306, 308, and 310, respectively).

The first through third wireless clients 108*a*-108*c* generate, in response to the first through third location requests, the first through third location reports, respectively (as shown by arrows 312, 314, and 316, respectively). The first AP 104 receives the first through third location reports from the first through third wireless clients 108*a*-108*c*, respectively (as shown by arrows 318, 320, and 322, respectively). The first through third location reports are indicative of the first through third locations of the first through third wireless clients 108*a*-108*c* in the wireless network environment 100, respectively. For the sake of ongoing discussion, it is assumed that the first through fourth APs 104 and 106*a*-106*c* are located at first through fourth predetermined locations in the wireless network environment 100, respectively.

The first AP 104 determines, for the first wireless client 108*a*, the first and second path loss values (as shown by arrow 324). The first and second path loss values are determined based on the first location report (i.e., a distance between the first AP 104 and the first wireless client 108*a* and a distance between the second AP 106*a* and the first wireless client 108*a*, respectively). The first AP 104 then determines whether the difference between the first and second path loss values is greater than or equal to the first threshold value (as shown by arrow 326). For the sake of ongoing discussion, it is assumed that the difference between the first and second path loss values is greater than or equal to the first threshold value.

Referring now to FIG. 3B, the first AP 104 determines, for the second wireless client 108*b*, the third and fourth path loss values (as shown by arrow 328). The third and fourth path loss values are determined based on the second location report (i.e., a distance between the first AP 104 and the second wireless client 108*b* and a distance between the second AP 106*a* and the second wireless client 108*b*, respectively). The first AP 104 then determines whether the difference between the third and fourth path loss values is greater than or equal to the first threshold value (as shown by arrow 330). For the sake of ongoing discussion, it is assumed that the difference between the third and fourth path loss values is less than the first threshold value.

The first AP 104 further determines, for the third wireless client 108*c*, the fifth and sixth path loss values (as shown by arrow 332). The fifth and sixth path loss values are determined based on the third location report (i.e., a distance between the first AP 104 and the third wireless client 108*c* and a distance between the second AP 106*a* and the third wireless client 108*c*, respectively). The first AP 104 further determines whether a difference between the fifth and sixth path loss values is greater than or equal to the first threshold value (as shown by arrow 334). For the sake of ongoing discussion, it is assumed that the difference between the fifth and sixth path loss values is less than the first threshold value.

The first AP 104 selects the first wireless client 108a for DMIMO communication based on the determination that the difference between the first and second path loss values is greater than or equal to the first threshold value (as shown by arrow 336). The first AP 104 then associates the first and second APs 104 and 106a with the first wireless clients 108a for enabling DMIMO communication between the first and second APs 104 and 106a and the first wireless client 108a (as shown by arrow 338). The first and second APs 104 and 106a then communicate with the first wireless client 108a by way of the DMIMO communication techniques. Further, the first AP 104 stores the data pertaining to the association of the first and second APs 104 and 106a with the first wireless client 108a in the memory (as shown by arrow 340). After the enablement of DMIMO communication, the first AP 104 continuously monitors the difference between the first and second path loss values, and dissociates the first wireless client 108a from the first and second APs 104 and 106a when the difference between the first and second path loss values is less than the second threshold value (as shown by arrow 342).

Figure 4A:
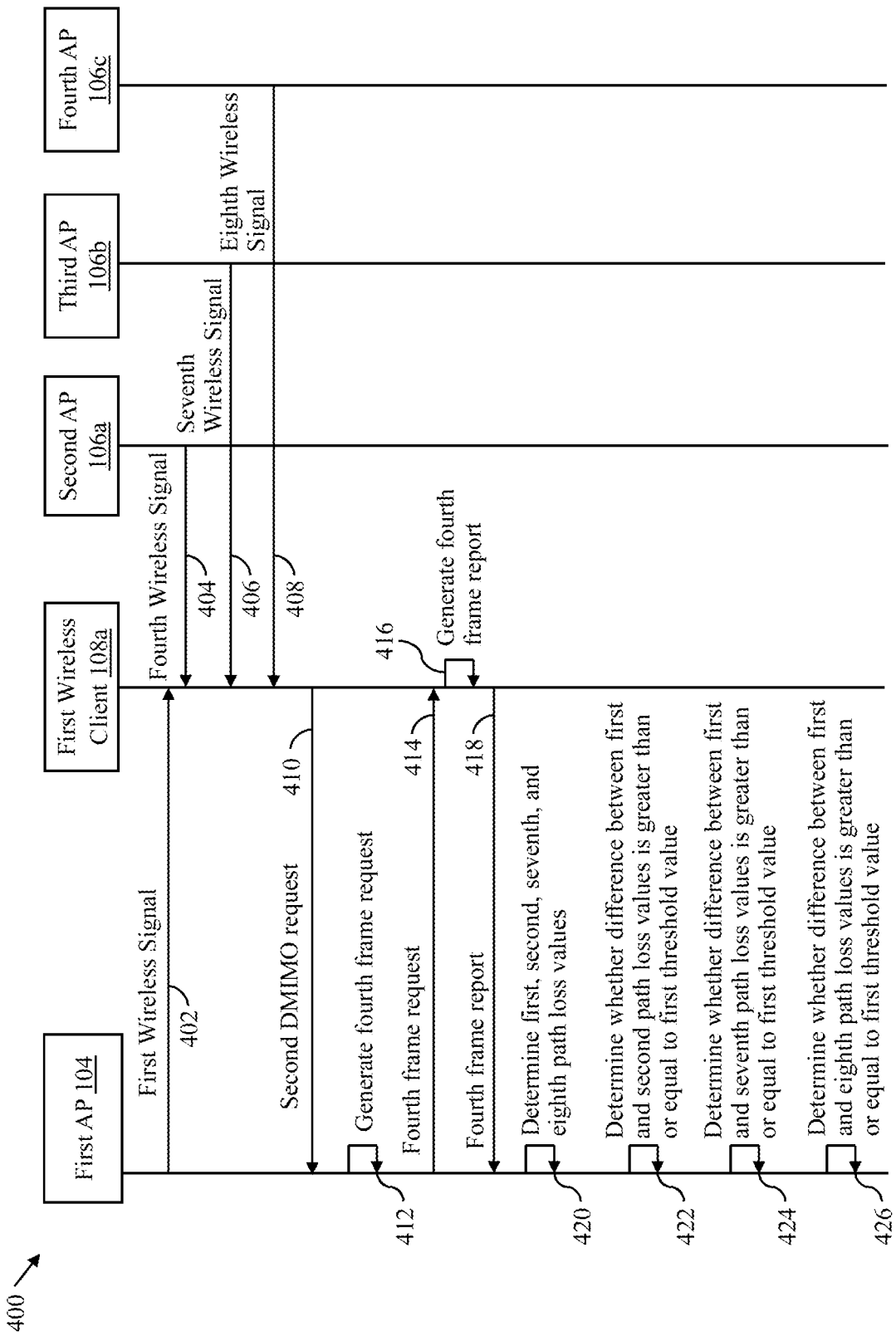
FIGS. 4A and 4B, collectively, is a sequence diagram that illustrates selection of the second AP for enabling DMIMO communication between the first and second APs and the first wireless client in accordance with an embodiment of the present disclosure.
Figure 4B:
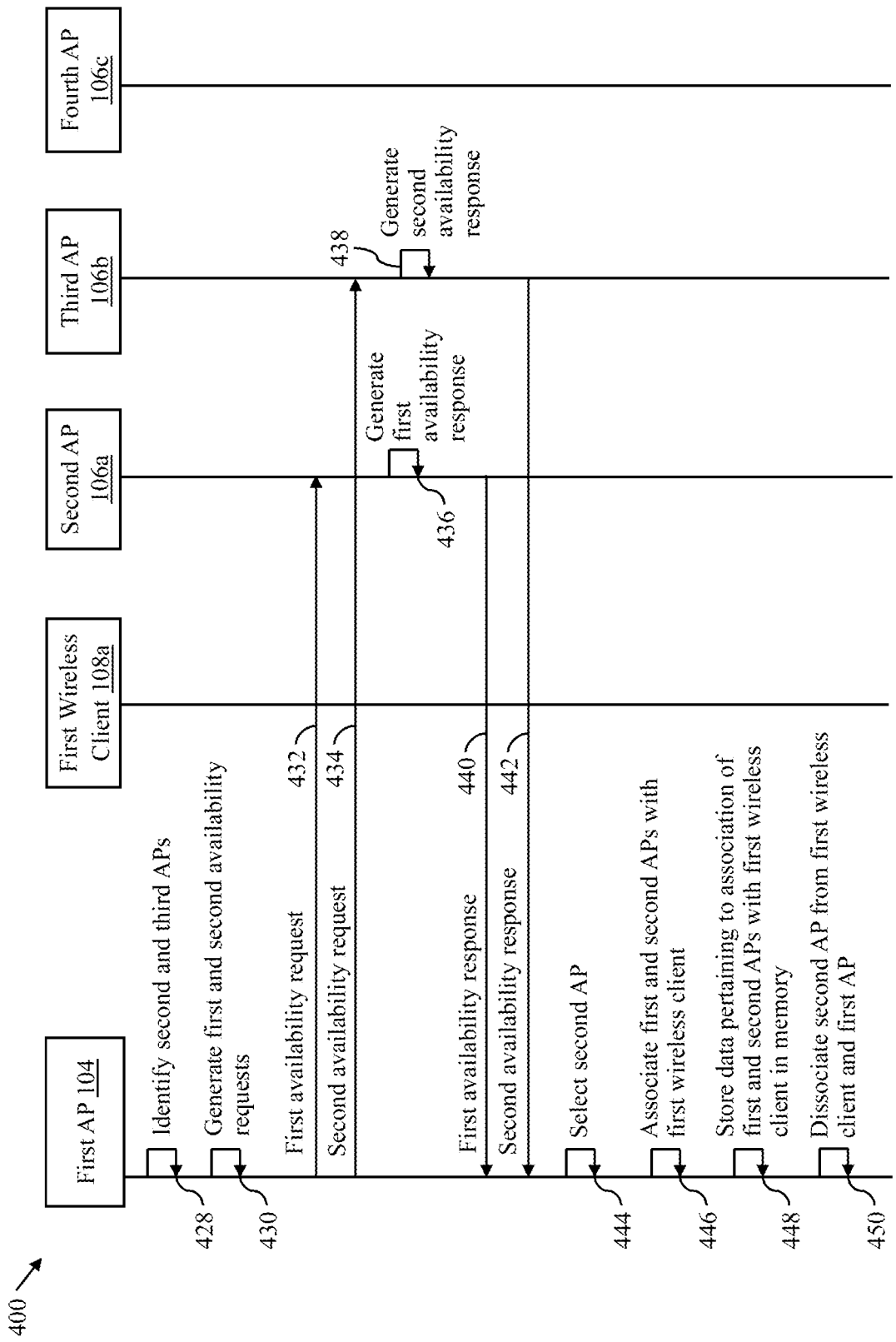

FIGS. 4A and 4B, collectively, is a sequence diagram 400 that illustrates the selection of the second AP 106a for enabling DMIMO communication between the first and second APs 104 and 106a and the first wireless client 108a in accordance with an embodiment of the present disclosure.

Referring now to FIG. 4A, the first and second APs 104 and 106a continuously transmit the first and fourth wireless signals to the first wireless client 108a, respectively (as shown by arrows 402 and 404, respectively). Similarly, the third and fourth APs 106b and 106c continuously transmit the seventh and eighth wireless signals to the first wireless client 108a, respectively (as shown by arrows 406 and 408, respectively). The fourth, seventh, and eighth wireless signals are collectively referred to as a "third plurality of wireless signals".

When the first wireless client 108a initiates DMIMO communication, the first AP 104 receives the second DMIMO request from the first wireless client 108a (as shown by arrow 410). The second DMIMO request indicates that the first wireless client 108a is available for DMIMO communication. The first AP 104, after receiving the second DMIMO request, generates and transmits the fourth frame request to the first wireless client 108a (as shown by arrows 412 and 414, respectively). In response to the fourth frame request, the first wireless client 108a generates the fourth frame report (as shown by arrow 416). The first AP 104 receives the fourth frame report from the first wireless client 108a (as shown by arrow 418). The fourth frame report is indicative of the first through fourth addresses associated with the first through fourth APs 104 and 106a-106c, signal strengths of the first, fourth, seventh, and eighth wireless signals received by the first wireless client 108a from the first through fourth APs 104 and 106a-106c, and the first through fourth BSSIDs of the first through fourth APs 104 and 106a-106c, respectively.

The first AP 104 then determines the first and second path loss values and seventh and eighth path loss values based on the fourth frame report (as shown by arrow 420). The seventh path loss value corresponds to the path loss value associated with the third AP 106b and the first wireless client 108a, and the eighth path loss value corresponds to the path loss value associated with the fourth AP 106c and the first wireless client 108a. The first and second path loss values are determined based on the signal strengths of the first and fourth wireless signals received by the first wireless client 108a from the first and second APs 104 and 106a, respectively. Similarly, the seventh and eighth path loss values are determined based on the signal strengths of the seventh and eighth wireless signals received by the first wireless client 108a from the third and fourth APs 106b and 106c, respectively. The first AP 104 then determines whether the difference between the first and second path loss values is greater than or equal to the first threshold value (as shown by arrow 422). Similarly, the first AP 104 then determines whether the difference between the first and seventh path loss values and the difference between the first and eighth path loss values are greater than or equal to the first threshold value (as shown by arrows 424 and 426). For the sake of ongoing discussion, it is assumed that the difference between the first and second path loss values and the difference between the first and seventh path loss values are greater than or equal to the first threshold value, and the difference between the first and eighth path loss values is less than the first threshold value.

Referring now to FIG. 4B, the first AP 104 identifies the second and third APs 106a and 106b for DMIMO communication based on the determination that the difference between the first and second path loss values and the difference between the first and seventh path loss values are greater than or equal to the first threshold value (as shown by arrow 428). The first AP 104 then generates the first and second availability requests for determining availability of the second and third APs 106a and 106b for enabling DMIMO communication (as shown by arrow 430). The first AP 104 then transmits the first and second availability requests to the second and third APs 106a and 106b, respectively (as shown by arrows 432 and 434, respectively). In response to the first and second availability requests, the second and third APs 106a and 106b generate the first and second availability responses that indicate whether the second and third APs 106a and 106b are available for enabling DMIMO communication (as shown by arrows 436 and 438, respectively). For the sake of ongoing discussion, it is assumed that the second AP 106a is available for enabling DMIMO communication, and the third AP 106b is unavailable for enabling DMIMO communication. The first AP 104 receives the first and second availability responses from the second and third APs 106a and 106b, respectively (as shown by arrows 440 and 442, respectively).

Upon reception of the first and second availability responses, the first AP 104 selects the second AP 106a for DMIMO communication (as shown by arrow 444). The first AP 104 associates the first and second APs 104 and 106a with the first wireless client 108a for enabling DMIMO communication between the first and second APs 104 and 106a and the first wireless client 108a (as shown by arrow 446). The first and second APs 104 and 106a then communicate with the first wireless client 108a by way of the DMIMO communication techniques. Further, the first AP 104 stores the data pertaining to the association of the first and second APs 104 and 106a with the first wireless client 108a in the memory (as shown by arrow 448). After the association of the first and second APs 104 and 106a with the first wireless client 108a, the first AP 104 continuously monitors the difference between the first and second path loss values and the availability of second AP 106a. When the difference between the first and second path loss values is less than the second threshold value or the second AP 106a is unavailable for DMIMO communication for the predetermined time duration, the first AP 104 dissociates the second AP 106a from the first wireless client 108a and the first AP 104 (as shown by arrow 450).

Although the sequence diagrams 200, 300, and 400 describe the association of the first and second APs 104 and 106a with the first wireless client 108a for enabling DMIMO communication therebetween, the scope of the present disclosure is not limited to it. In various other embodiments, after the association of the first and second APs 104 and 106a with the first wireless client 108a, the second wireless client 108b is selected for DMIMO communication by the second AP 106a, without deviating from the scope of the disclosure. The second wireless client 108b is selected such that the difference between the fourth path loss value that is associated with the second AP 106a and the second wireless client 108b, and the third path loss value that is associated with the first AP 104 and the second wireless client 108b is greater than or equal to the first threshold value. The first and second APs 104 and 106a are further associated with the second wireless client 108b for enabling DMIMO communication between the first and second APs 104 and 106a and the second wireless client 108b. DMIMO communication in such a scenario is referred to as multi-user DMIMO (MU-DMIMO) communication.

FIG. 5 illustrates a schematic block diagram of the first AP 104 in accordance with an embodiment of the present disclosure. The first AP 104 includes the memory (hereinafter referred to and designated as the "memory 502"), a wireless network interface 504, and processing circuitry 506.

The memory 502 is configured to store various instructions that when executed by the processing circuitry 506 cause the processing circuitry 506 to execute operations for enabling DMIMO communication as described in the foregoing description of FIGS. 1, 2A, 2B, 3A, 3B, 4A, and 4B. The instructions stored in the memory 502 are pursuant to various standards and protocols (e.g., IEEE 802.11) set forth for wireless communication. The memory 502 is further configured to store the data pertaining to the association of the first and second APs 104 and 106a with the first wireless client 108a. Examples of the memory 502 may include a solid state drive (SSD), a random-access memory (RAM), a read-only memory (ROM), a hard disk drive (HDD), a flash memory, a removable storage device, or the like.

The wireless network interface 504 is configured to wirelessly communicate with the second through fourth APs 106a-106c and the first through third wireless clients 108a-108c. Examples of the wireless network interface 504 may include wireless IEEE 802.11 interface, wireless WiMAX interface, cellular wireless interface, satellite transmission interface, or the like. It will be apparent to a person skilled in the art that the scope of the present disclosure is not limited to the first AP 104 including a single wireless network interface. In various other embodiments, the first AP 104 may include more than one wireless network interfaces, without deviating from the scope of disclosure.

The processing circuitry 506 is coupled with the memory 502 and the wireless network interface 504, and is configured to execute the instructions stored in the memory 502 to execute various operations for enabling DMIMO communication in the wireless network environment 100, as explained in conjunction with FIGS. 1, 2A, 2B, 3A, 3B, 4A, and 4B. For example, the processing circuitry 506 is configured to transmit the first through third wireless signals to the first through third wireless clients 108a-108c, respectively.

When DMIMO communication is initiated by the second AP 106a, the processing circuitry 506 is configured to receive the first DMIMO request from the second AP 106a. Upon reception of the first DMIMO request, the processing circuitry 506 is further configured to generate and transmit the first through third communication requests to the first through third wireless clients 108a-108c, and receive the first through third communication responses from the first through third wireless clients 108a-108c, respectively. The processing circuitry 506 is further configured to determine, for each wireless client of the first through third wireless clients 108a-108c based on each corresponding communication response, the path loss value associated with the first AP 104 and each wireless client, and the path loss value associated with the second AP 106a and each wireless client. The processing circuitry 506 is further configured to determine, for each wireless client, whether the difference between the path loss value associated with the first AP 104 and each wireless client, and the path loss value associated with the second AP 106a and each wireless client is greater than or equal to the first threshold value. Based on the determination that the difference between the first and second path loss values is greater than or equal to the first threshold value, the processing circuitry 506 is further configured to select the first wireless client 108a for DMIMO communication. Thus, the processing circuitry 506 selects the first wireless client 108a for DMIMO communication when the first and second APs 104 and 106a are available for DMIMO communication.

The processing circuitry 506 is further configured to associate the first and second APs 104 and 106a with the first wireless client 108a for enabling DMIMO communication between the first and second APs 104 and 106a and the first wireless client 108a. The first and second APs 104 and 106a then communicate with the first wireless client 108a by way of the DMIMO communication techniques. The processing circuitry 506 is further configured to store, in the memory 502, the data pertaining to the association of the first and second APs 104 and 106a with the first wireless client 108a. The processing circuitry 506 is further configured to dissociate the first wireless client 108a from the first and second APs 104 and 106a when the difference between the first and second path loss values is less than the second threshold value.

When DMIMO communication is initiated by the first wireless client 108a, the processing circuitry 506 is configured to receive the second DMIMO request from the first wireless client 108a. Upon reception of the second DMIMO request, the processing circuitry 506 is further configured to generate and transmit the fourth frame request to the first wireless client 108a, and receive the fourth frame report from the first wireless client 108a. The processing circuitry 506 is further configured to determine, based on the fourth frame report, the first path loss value. Similarly, the processing circuitry 506 is further configured to determine, for each AP of the second through fourth APs 106a-106c based the fourth frame report, the path loss value associated with each AP of the second through fourth APs 106a-106c and the first wireless client 108a. The processing circuitry 506 is further configured to determine, for each AP of the second through fourth APs 106a-106c, whether the difference between the first path loss value and the path loss value associated with each AP of the second through fourth APs 106a-106c and the first wireless client 108a is greater than or equal to the first threshold value. Further, the processing circuitry 506 is configured to identify, from the second through fourth APs 106a-106c, the second and third APs 106a and 106b (i.e., the set of APs) such that for each AP of the second and third APs 106a and 106b, the difference between the first path loss value and the path loss value associated the corresponding AP and the first wireless client 108*a* is greater than or equal to the first threshold value.

The processing circuitry 506 is further configured to generate and transmit, based on the identification of the second and third APs 106*a* and 106*b*, the first and second availability requests to the second and third APs 106*a* and 106*b*, respectively. Further, the processing circuitry 506 is configured to receive first and second availability responses to the first and second availability requests from the second and third APs 106*a* and 106*b*, respectively. The first and second availability responses are indicative of the availability of the second and third APs 106*a* and 106*b* for enabling DMIMO communication. The processing circuitry 506 is further configured to select, based on the first and second availability responses, one of the second or third AP 106*a* or 106*b* for DMIMO communication. For the sake of ongoing discussion, it is assumed that the second AP 106*a* is available and the third AP 106*b* is unavailable for enabling DMIMO communication. Thus, the processing circuitry 506 selects the second AP 106*a* for DMIMO when the first AP 104 and the first wireless client 108*a* are available for DMIMO communication.

The processing circuitry 506 is further configured to associate the first and second APs 104 and 106*a* with the first wireless client 108*a* for enabling DMIMO communication between the first and second APs 104 and 106*a* and the first wireless client 108*a*. The first and second APs 104 and 106*a* then communicate with the first wireless client 108*a* by way of the DMIMO communication techniques. The processing circuitry 506 is further configured to store, in the memory 502, the data pertaining to the association of the first and second APs 104 and 106*a* with the first wireless client 108*a*. When the difference between the first and second path loss values is less than the second threshold value or the second AP 106*a* is unavailable for DMIMO communication for the predetermined time duration, the processing circuitry 506 is further configured to dissociate the second AP 106*a* from the first AP 104 and the first wireless client 108*a*. Examples of the processing circuitry 506 may include a microcontroller, a microprocessor, an application specific integrated circuit (ASIC) processor, a reduced instruction set computer (RISC) processor, a complex instruction set computer (CISC) processor, a field programmable gate array (FPGA), or the like.

Figure 6:
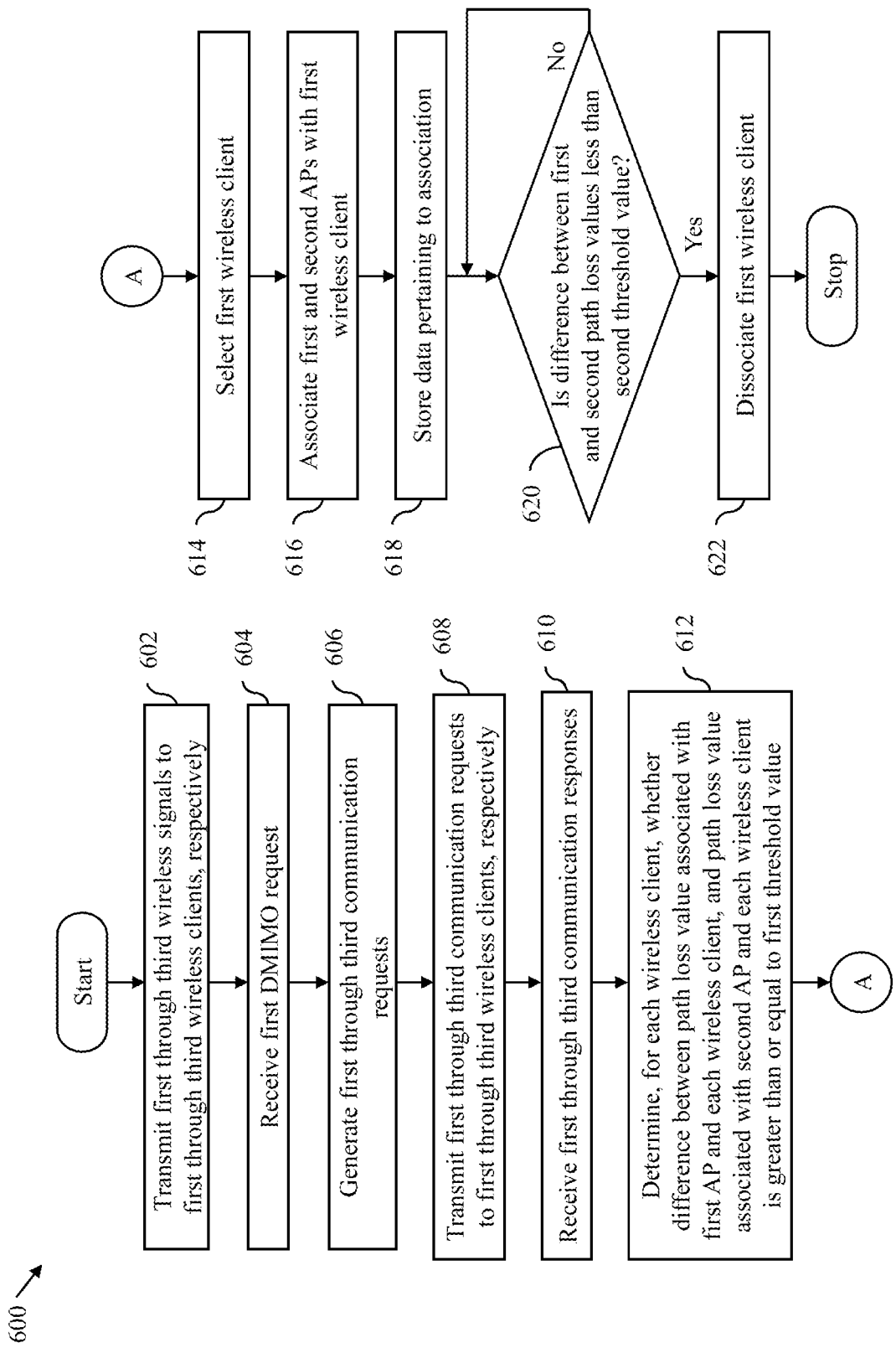
FIG. 6 represents a flowchart that illustrates a method for enabling DMIMO communication in the wireless network environment in accordance with an embodiment of the present disclosure.

FIG. 6 represents a flowchart 600 that illustrates a method for enabling DMIMO communication in the wireless network environment 100 in accordance with an embodiment of the present disclosure. For the sake of ongoing discussion, it is assumed that DMIMO communication is initiated by the second AP 106*a*. At step 602, the first AP 104 transmits the first through third wireless signals to the first through third wireless clients 108*a*-108*c*, respectively.

At step 604, the first AP 104 receives the first DMIMO request from the second AP 106*a*. The first DMIMO request indicates that the second AP 106*a* is available for DMIMO communication. At step 606, the first AP 104 generates the first through third communication requests. In an embodiment, the first through third communication requests correspond to the first through third frame requests, respectively. In another embodiment, the first through third communication requests correspond to the first through third location requests, respectively. At step 608, the first AP 104 transmits the first through third communication requests to the first through third wireless clients 108*a*-108*c*, respectively. In response to the first through third communication requests, the first through third wireless clients 108*a*-108*c* generate the first through third communication responses, respectively. When the first through third communication requests correspond to the first through third frame requests, the first through third communication responses correspond to the first through third frame reports, respectively. Similarly, when the first through third communication requests correspond to the first through third location requests, the first through third communication responses correspond to the first through third location reports, respectively. At step 610, the first AP 104 receives the first through third communication responses from the first through third wireless clients 108*a*-108*c*, respectively.

At step 612, the first AP 104 determines, for each wireless client of the first through third wireless clients 108*a*-108*c* based on each corresponding communication response, whether the difference between the path loss value associated with the first AP 104 and each wireless client, and the path loss value associated with the second AP 106*a* and each wireless client is greater than or equal to the first threshold value. In an example, for the first wireless client 108*a*, the first AP 104 determines the first and second path loss values, and whether the difference between the first and second path loss values is greater than or equal to the first threshold value. Similarly, for the second wireless client 108*b*, the first AP 104 determines the third and fourth path loss values, and whether the difference between the third and fourth path loss values is greater than or equal to the first threshold value. Further, for the third wireless client 108*c*, the first AP 104 determines the fifth and sixth path loss values, and whether the difference between the first and second path loss values is greater than or equal to the first threshold value. The first and second path loss values are determined based on the first communication response, the third and fourth path loss values are determined based on the second communication response, and the fifth and sixth path loss values are determined based on the third communication response.

At step 614, the first AP 104 selects the first wireless client 108*a* for DMIMO communication based on the determination that the difference between the first and second path loss values is greater than or equal to the first threshold value. At step 616, the first AP 104 associates the first and second APs 104 and 106*a* with the first wireless client 108*a* for enabling DMIMO communication between the first and second APs 104 and 106*a* and the first wireless client 108*a*. The first and second APs 104 and 106*a* then communicate with the first wireless client 108*a* by way of the DMIMO communication techniques. At step 618, the first AP 104 stores the data pertaining to the association of the first and second APs 104 and 106*a* with the first wireless client 108*a* in the memory 502.

At step 620, the first AP 104 determines if the difference between the first and second path loss values is less than the second threshold value. If at step 620, the first AP 104 determines that the difference between the first and second path loss values is greater than or equal to the second threshold value, step 620 is performed (i.e., the method halts until the difference between the first and second path loss values is less than the second threshold value). If at step 620, the first AP 104 determines that the difference between the first and second path loss values is less than the second threshold value, step 622 is performed. At step 622, the first AP 104 dissociates the first wireless client 108*a* from the first and second APs 104 and 106*a*.

Figure 7A:
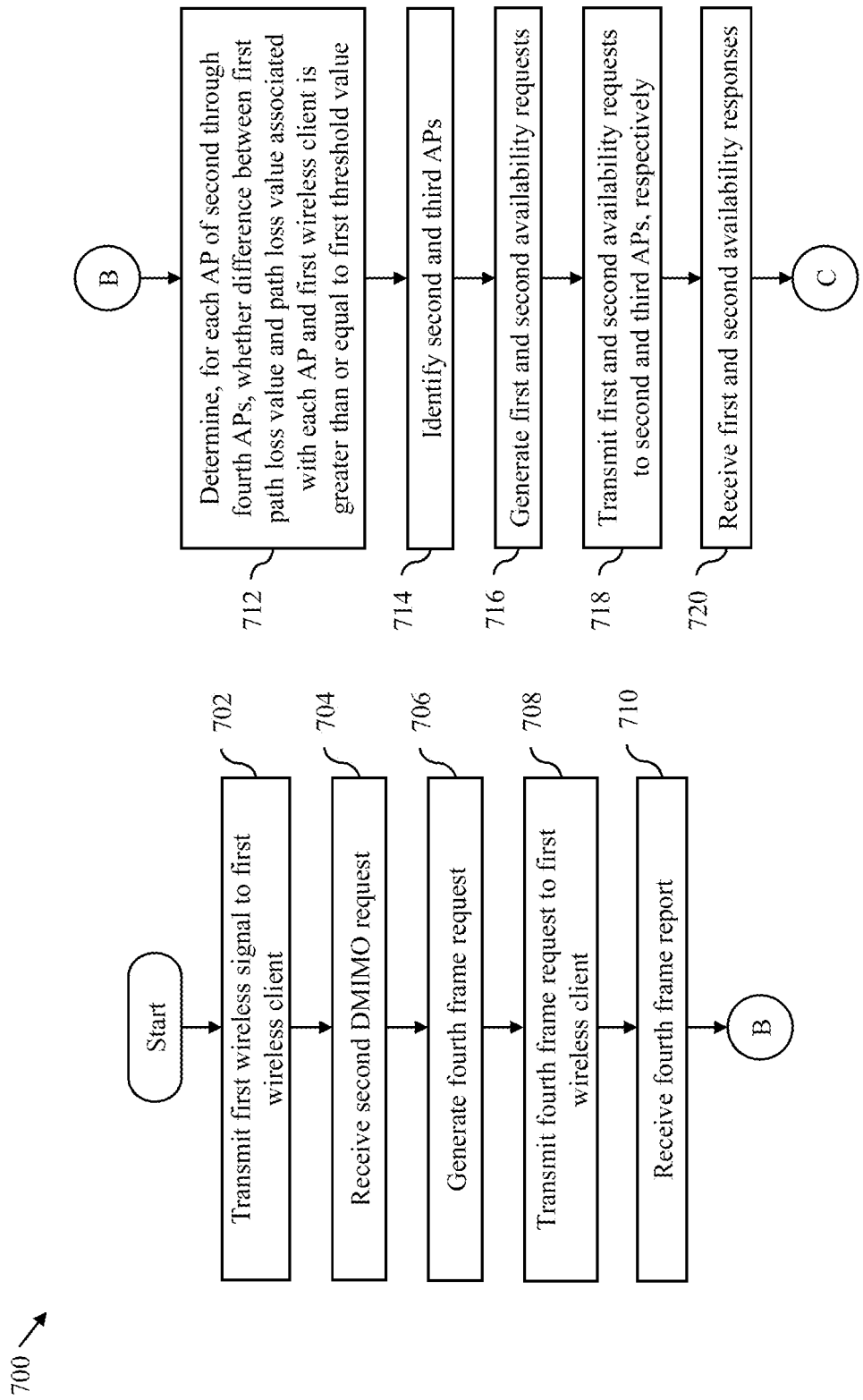
FIGS. 7A and 7B, collectively, represents a flowchart that illustrates a method for enabling DMIMO communication in the wireless network environment in accordance with another embodiment of the present disclosure.
Figure 7B:
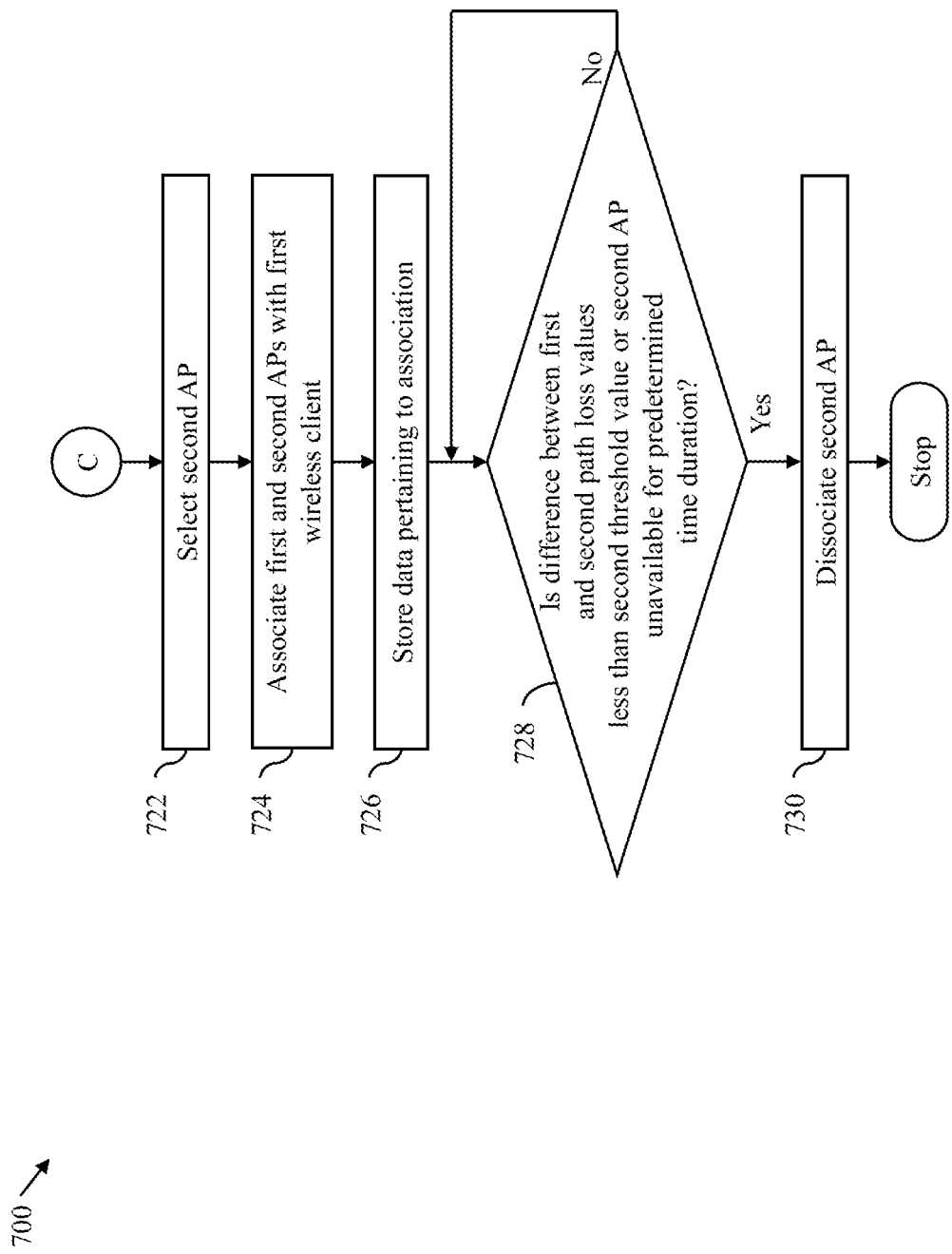

FIGS. 7A and 7B, collectively, represents a flowchart 700 that illustrates a method for enabling DMIMO communication in the wireless network environment 100 in accordance with another embodiment of the present disclosure. For the sake of ongoing discussion, it is assumed that DMIMO communication is initiated by the first wireless client 108a. Referring now to FIG. 7A, at step 702, the first AP 104 transmits the first wireless signal to the first wireless client 108a.

At step 704, the first AP 104 receives the second DMIMO request from the first wireless client 108a. The second DMIMO request indicates that the first wireless client 108a is available for DMIMO communication. At step 706, the first AP 104 generates the fourth frame request. At step 708, the first AP 104 transmits the fourth frame request to the first wireless client 108a. In response to the fourth frame request, the first wireless client 108a generates the fourth frame report. At step 710, the first AP 104 receives the fourth frame report from the first wireless client 108a.

At step 712, the first AP 104 determines, for each AP of the second through fourth APs 106a-106c based on the fourth frame report, whether the difference between the first path loss value and the path loss value associated with each AP of the second through fourth APs 106a-106c and the first wireless client 108a is greater than or equal to the first threshold value. For example, the first AP 104 determines the first, second, seventh, and eighth path loss values based on the fourth frame report. Further, for the second AP 106a, the first AP 104 determines whether the difference between the first and second path loss values is greater than or equal to the first threshold value. Similarly, for the third and fourth APs 106b and 106c, the first AP 104 determines whether the difference between the first and seventh path loss values and the difference between the first and eighth path loss values are greater than or equal to the first threshold value, respectively.

At step 714, the first AP 104 identify, from the second through fourth APs 106a-106c, the second and third APs 106a and 106b (i.e., the set of APs) such that the difference between the first and second path loss values and the difference between the first and seventh path loss values are greater than or equal to the first threshold value.

At step 716, the first AP 104 generates the first and second availability requests based on the identification of the second and third APs 106a and 106b, respectively. At step 718, the first AP 104 transmits the first and second availability requests to the second and third APs 106a and 106b, respectively. In response to the first and second availability requests, the second and third APs 106a and 106b generate the first and second availability responses that are indicative of the availability of the second and third APs 106a and 106b for enabling DMIMO communication, respectively. At step 720, the first AP 104 receives the first and second availability responses from the second and third APs 106a and 106b, respectively.

Referring now to FIG. 7B, at step 722, the first AP 104 selects one of the second or third AP 106a or 106b for DMIMO communication based on the first and second availability responses, respectively. For the sake ongoing discussion, it is assumed that the second AP 106a is available for enabling DMIMO communication and the third AP 106b is unavailable for enabling DMIMO communication. Thus, the first AP 104 selects the second AP 106a for DMIMO communication. At step 724, the first AP 104 associates the first and second APs 104 and 106a with the first wireless client 108a for enabling DMIMO communication between the first and second APs 104 and 106a and the first wireless client 108a. The first and second APs 104 and 106a then communicate with the first wireless client 108a by way of the DMIMO communication techniques. At step 726, the first AP 104 stores the data pertaining to the association of the first and second APs 104 and 106a with the first wireless client 108a in the memory 502.

At step 728, the first AP 104 determines if the difference between the first and second path loss values is less than the second threshold value or the second AP 106a is unavailable for DMIMO communication for the predetermined time duration. If at step 728, the first AP 104 determines the difference between the first and second path loss values is greater than or equal to the second threshold value and the second AP 106a is available for DMIMO communication, step 728 is performed. In other words, the method is halted until the difference between the first and second path loss values is less than the second threshold value or the second AP 106a is unavailable for DMIMO communication for the predetermined time duration. If at step 728, the first AP 104 determines the difference between the first and second path loss values is less than the second threshold value or the second AP 106a is unavailable for DMIMO communication for the predetermined time duration, step 730 is performed At step 730, the first AP 104 dissociates the second AP 106a from the first AP 104 and the first wireless client 108a.

Thus, the first AP 104 ensures that the second AP 106a or the first wireless client 108a is selected for DMIMO communication exclusively when the difference between the first and second path loss values is greater than or equal to the first threshold value. The selection of the second AP 106a or the first wireless client 108a based on the difference between the first and second path loss values ensures that a level of synchronization required between the first and second APs 104 and 106a and the first wireless client 108a is less than that required between APs and a wireless client that are selected by way of conventional selection techniques. As a result, performances (i.e., data transfer speeds and throughputs) of the first and second APs 104 and 106a and the first wireless client 108a are higher than that of the APs and the wireless client selected by way of the conventional selection techniques.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

What is claimed is:

1. A first access point (AP) of a wireless network for enabling distributed multiple-input-multiple-output (DMIMO) communication in the wireless network, the first AP comprising:
   processing circuitry configured to:
      select, for DMIMO communication, at least one of a first wireless client from a plurality of wireless clients of the wireless network and a second AP from a plurality of APs of the wireless network, wherein the first wireless client is selected when the first and second APs are available for DMIMO communication, and the second AP is selected when the first wireless client and the first AP are available for DMIMO communication, and wherein the second AP and the first wireless client are selected such that a difference between a first path loss value that is associated with the first AP and the first wireless client, and a second path loss value that is associated with the second AP and the first wireless client is greater than or equal to a first threshold value;

associate the first and second APs with the first wireless client for enabling DMIMO communication between the first and second APs and the first wireless client;

transmit a first plurality of wireless signals to the plurality of wireless clients such that a first wireless signal of the first plurality of wireless signals is transmitted to the first wireless client;

receive a first DMIMO request from the second AP, wherein the first DMIMO request indicates that the second AP is available for DMIMO communication;

generate and transmit, upon reception of the first DMIMO request, a plurality of communication requests to the plurality of wireless clients, respectively;

receive, from the plurality of wireless clients, a plurality of communication responses to the plurality of communication requests, respectively; and determine, for each wireless client of the plurality of wireless clients based on each corresponding communication response, whether a difference between a path loss value associated with the first AP and each wireless client, and a path loss value associated with the second AP and each wireless client is greater than or equal to the first threshold value, wherein based on the determination that the difference between the first and second path loss values is greater than or equal to the first threshold value, the first wireless client is selected for DMIMO communication.

2. The first AP of claim 1, wherein each communication request of the plurality of communication requests corresponds to a frame request, and each communication response of the plurality of communication responses corresponds to a frame report, and wherein a first communication response of the plurality of communication responses is indicative of a signal strength of the first wireless signal, and a signal strength of a second wireless signal that is received by the first wireless client from the second AP.

3. The first AP of claim 1, wherein each communication request of the plurality of communication requests corresponds to a location request, and each communication response of the plurality of communication responses corresponds to a location report, and wherein a first communication response of the plurality of communication responses is indicative of a location of the first wireless client.

4. The first AP of claim 1, wherein the processing circuitry is further configured to:

receive a second DMIMO request from the first wireless client, wherein the second DMIMO request indicates that the first wireless client is available for DMIMO communication;

generate and transmit, upon reception of the second DMIMO request, a frame request to the first wireless client;

receive, from the first wireless client, a frame report to the frame request;

determine, for each AP of the plurality of APs based the frame report, whether a difference between the first path loss value and a path loss value associated with each AP of the plurality of APs and the first wireless client is greater than or equal to the first threshold value; and identify, from the plurality of APs, a set of APs such that for each AP of the set of APs, the difference between the first path loss value and the path loss value associated with each AP of the set of APs and the first wireless client is greater than or equal to the first threshold value.

5. The first AP of claim 4, wherein the frame report is indicative of a first address of the first AP, a signal strength of the first wireless signal, a first basic service set identifier of the first AP, a second plurality of addresses associated with the plurality of APs, signal strengths of a second plurality of wireless signals that are received by the first wireless client from the plurality of APs, and a second plurality of basic service set identifiers of the plurality of APs, respectively.

6. The first AP of claim 4, wherein the processing circuitry is further configured to:

generate and transmit, based on the identification of the set of APs, a set of availability requests to the set of APs, respectively; and receive, from the set of APs, a set of availability responses to the set of availability requests, respectively, wherein a first availability response of the set of availability responses is indicative of an availability of the second AP for enabling DMIMO communication, and wherein the second AP is selected when the first availability response indicates that the second AP is available.

7. The first AP of claim 1, further comprising a memory that is coupled with the processing circuitry, wherein the processing circuitry is further configured to store, in the memory, data pertaining to the association of the first and second APs with the first wireless client.

8. The first AP of claim 1, wherein the processing circuitry is further configured to dissociate the second AP from the first wireless client and the first AP when at least one of the difference between the first and second path loss values is less than a second threshold value and the second AP is unavailable for DMIMO communication for a predetermined time duration.

9. The first AP of claim 1, wherein the processing circuitry is further configured to dissociate the first wireless client from the first and second APs when the difference between the first and second path loss values is less than a second threshold value.

10. A method for enabling distributed multiple-input-multiple-output (DMIMO) communication in a wireless network, the method comprising:

selecting, by a first access point (AP) of the wireless network for DMIMO communication, at least one of a first wireless client from a plurality of wireless clients of the wireless network and a second AP from a plurality of APs of the wireless network, wherein the first wireless client is selected when the first and second APs are available for DMIMO communication, and the second AP is selected when the first wireless client and the first AP are available for DMIMO communication, and wherein the second AP and the first wireless client are selected such that a difference between a first path loss value that is associated with the first AP and the first wireless client and a second path loss value that is associated with the second AP and the first wireless client is greater than or equal to a first threshold value;

associating, by the first AP, the first and second APs with the first wireless client for enabling DMIMO communication between the first and second APs and the first wireless client;

transmitting, by the first AP, a first plurality of wireless signals to the plurality of wireless clients such that a first wireless signal of the first plurality of wireless signals is transmitted to the first wireless client;

receiving, by the first AP, a first DMIMO request from the second AP, wherein the first DMIMO request indicates that the second AP is available for DMIMO communication;

generating and transmitting, by the first AP upon reception of the first DMIMO request, a plurality of communication requests to the plurality of wireless clients, respectively;

receiving, by the first AP from the plurality of wireless clients, a plurality of communication responses to the plurality of communication requests, respectively; and determining, by the first AP for each wireless client of the plurality of wireless clients based on each corresponding communication response, whether a difference between a path loss value associated with the first AP and each wireless client, and a path loss value associated with the second AP and each wireless client is greater than or equal to the first threshold value, wherein based on the determination that the difference between the first and second path loss values is greater than or equal to the first threshold value, the first wireless client is selected by the first AP for DMIMO communication.

11. The method of claim 10, wherein each communication request of the plurality of communication requests corresponds to a frame request, and each communication response of the plurality of communication responses corresponds to a frame report, and wherein a first communication response of the plurality of communication responses is indicative of a signal strength of the first wireless signal, and a signal strength of a second wireless signal that is received by the first wireless client from the second AP.

12. The method of claim 10, wherein each communication request of the plurality of communication requests corresponds to a location request, and each communication response of the plurality of communication responses corresponds to a location report, and wherein a first communication response of the plurality of communication responses is indicative of a location of the first wireless client.

13. The method of claim 10, further comprising:
receiving, by the first AP, a second DMIMO request from the first wireless client, wherein the second DMIMO request indicates that the first wireless client is available for DMIMO communication;

generating and transmitting, by the first AP upon reception of the second DMIMO request, a frame request to the first wireless client;

receiving, by the first AP from the first wireless client, a frame report to the frame request, wherein the frame report is indicative of a first address of the first AP, a signal strength of the first wireless signal that is received by the first wireless client from the first AP, a first basic service set identifier of the first AP, a second plurality of addresses associated with the plurality of APs, signal strengths of a second plurality of wireless signals that are received by the first wireless client from the plurality of APs, and a second plurality of basic service set identifiers of the plurality of APs, respectively;

determining, by the first AP for each AP of the plurality of APs based the frame report, whether a difference between the first path loss value and a path loss value associated with each AP of the plurality of APs and the first wireless client is greater than or equal to the first threshold value; and identifying, by the first AP from the plurality of APs, a set of APs such that for each AP of the set of APs, the difference between the first path loss value and the path loss value associated with each AP of the set of APs and the first wireless client is greater than or equal to the first threshold value.

14. The method of claim 13, further comprising:
generating and transmitting, based on the identification of the set of APs by the first AP, a set of availability requests to the set of APs, respectively; and receiving, by the first AP from the set of APs, a set of availability responses to the set of availability requests, respectively, wherein a first availability response of the set of availability responses is indicative of an availability of the second AP for enabling DMIMO communication, and wherein the second AP is selected when the first availability response indicates that the second AP is available.

15. The method of claim 10, further comprising dissociating, by the first AP, the second AP from the first wireless client and the first AP when at least one of the difference between the first and second path loss values is less than a second threshold value and the second AP is unavailable for DMIMO communication for a predetermined time duration.

16. The method of claim 10, further comprising dissociating, by the first AP, the first wireless client from the first and second APs when the difference between the first and second path loss values is less than a second threshold value.

17. A first access point (AP) of a wireless network for enabling distributed multiple-input-multiple-output (DMIMO) communication in the wireless network, the first AP comprising:
processing circuitry configured to:
select, for DMIMO communication, at least one of a first wireless client from a plurality of wireless clients of the wireless network and a second AP from a plurality of APs of the wireless network, wherein the first wireless client is selected when the first and second APs are available for DMIMO communication, and the second AP is selected when the first wireless client and the first AP are available for DMIMO communication, and wherein the second AP and the first wireless client are selected such that a difference between a first path loss value that is associated with the first AP and the first wireless client, and a second path loss value that is associated with the second AP and the first wireless client is greater than or equal to a first threshold value;

associate the first and second APs with the first wireless client for enabling DMIMO communication between the first and second APs and the first wireless client;

transmit a first plurality of wireless signals to the plurality of wireless clients such that a first wireless signal of the first plurality of wireless signals is transmitted to the first wireless client;

receive a second DMIMO request from the first wireless client, wherein the second DMIMO request indicates that the first wireless client is available for DMIMO communication;

generate and transmit, upon reception of the second DMIMO request, a frame request to the first wireless client;

receive, from the first wireless client, a frame report to the frame request;

determine, for each AP of the plurality of APs based the frame report, whether a difference between the first path loss value and a path loss value associated with each AP of the plurality of APs and the first wireless client is greater than or equal to the first threshold value; and identify, from the plurality of APs, a set of APs such that for each AP of the set of APs, the difference between the first path loss value and the path loss value associated with each AP of the set of APs and the first wireless client is greater than or equal to the first threshold value.

18. The first AP of claim 17, wherein the frame report is indicative of a first address of the first AP, a signal strength of the first wireless signal, a first basic service set identifier of the first AP, a second plurality of addresses associated with the plurality of APs, signal strengths of a second plurality of wireless signals that are received by the first wireless client from the plurality of APs, and a second plurality of basic service set identifiers of the plurality of APs, respectively.

19. The first AP of claim 17, wherein the processing circuitry is further configured to dissociate the second AP from the first wireless client and the first AP when at least one of the difference between the first and second path loss values is less than a second threshold value and the second AP is unavailable for DMIMO communication for a predetermined time duration.

20. The first AP of claim 17, wherein the processing circuitry is further configured to dissociate the first wireless client from the first and second APs when the difference between the first and second path loss values is less than a second threshold value.

* * * * *